3,081,184
METHOD FOR STABILIZING VISCOSITY OF COMPOSITE STARCH ADHESIVES PASTES
Hugh M. Mosher, Piedmont, and William J. Moore, Concord, Calif., assignors to Minerals & Chemicals Philipp Corporation, a corporation of Maryland
No Drawing. Filed Nov. 21, 1958, Ser. No. 775,377
5 Claims. (Cl. 106—213)

The instant invention relates to a method for stabilizing the viscosity of a flowable composition which tends to decrease in viscosity as the composition is mechanically worked, as by pumping. Although the method of our invention has utility in improving the viscosity characteristics of a variety of materials in many fields of application, it has particular utility in improving the viscosity characteristics of composite starch adhesives widely used in the preparation of corrugating board, particularly such adhesives which are cycled by a pump to the corrugating machine. Accordingly, the invention will be described with particular reference to its utility in the art of preparing corrugated board using a composite starch adhesive.

Corrugated board, such as is widely used in manufacture of cartons and containers, consists of a corrugated core covered by a liner of liners, as the case may be. The corrugated core is usually prepared from 0.009" paper which is corrugated by passing through heated corrugating rolls. Jute or kraft liner board is attached to the flutes of the corrugations, utilizing a sodium silicate or starch adhesive. When only one liner is used the board is conventionally referred to as "single face" board and when liners attached to opposing faces of the core sheet are used, the board is called "double face" board.

The considerations for a corrugating adhesive are unique because the flutes of the core are coated with an adhesive while the core is on the corrugating roll. Immediately after application of the adhesive to the flute tips a liner is contacted therewith and pressure is applied to the adhesive bond while the corrugated core and the liner are passing between the corrugating roll and a heated smooth roll, which immediately sets the adhesive. In the case of double faced corrugated board a liner is then secured to the other side of the corrugated core in like fashion.

Conventional adhesives for corrugating work of this kind have included silicate adhesives and starch adhesives, particularly composite starch adhesives which comprise raw or pearl starch suspended in a suitably bodied carrier, typically a cooked starch base material. The principal binding is contributed by the raw starch which when subjected to heat gelatinizes in situ thereby to bind the liner to the core. The carrier portion ordinarily has some adhesive value although usually it is very minor as compared to that of the raw starch. Raw starch is preferred to cooked starch as an adhesive because it gives stronger joints.

Although composite starch adhesive have many well-known advantages over silicate adhesives both with respect to cost, character of bond and lack of deleterious effect on bearings and mechanical parts of the equipment involved, nevertheless, the viscosity characteristics of the composite adhesives leave much to be desired. Specifically, the viscosity of the composite starch adhesive tends to become progressively reduced as it is cycled by pumps throughout the corrugating plant. The adhesive paste is preferably handled in a circulating system which provides for recirculating unused adhesive to storage as well as for providing for return to the storage of overflow from the glue pot. Thus the adhesive is continually or continuously being circulated by a pump or pumps. Adhesive consumption is increased when the adhesive is applied in a state of reduced viscosity. To compensate for the reduction in viscosity of the paste requires careful adjustment of machine speed, quantity of adhesive applied per flute, etc. Such control is not only difficult but often is not readily realized. In many cases no attempt is made to exercise such control.

Accordingly, it is a principal object of the subject invention to provide a novel method for stabilizing the viscosity of a flowable aqueous composition which, when mechanically worked as by being continuously or continually cycled by a pump, tends to become reduced in viscosity in a progressive manner.

Another and more specific object of the invention is the provision of a simple, inexpensive method to prevent the progressive reduction in viscosity of a composite starch adhesive paste when said adhesive paste is cycled by a pump.

Still another object of the subject invention is the provision of an improved composite starch adhesive paste and method for making the same, the improved paste having excellent bonding properties and being characterized by a viscosity materially more constant when sheared, as by pumping, than composite starch adhesives pastes heretofore available, thereby avoiding the aforementioned difficulties involved in corrugating board utilizing a composite starch paste as an adhesive.

These and further objects and advantages are realized in accordance with the instant invention wherein an aqueous composite starch paste which normally tends to become reduced progressively in viscosity when mechanically worked there is incorporated in substantially undispersed state a material selected from the group consisting of colloidal attapulgite and colloidal sepiolite. As a result of the inclusion of said material, the rheology of the modified composite starch paste is favorably altered in that the worked paste has a viscosity materially more constant than it would be in the absence of the colloidal attapulgite or colloidal sepiolite. The terms "undispersed" and "colloidal" will be described hereafter.

Our invention as applied to improving the properties of a composite starch adhesive as it is fed to a corrugating machine and recycled through the corrugating plant involves the addition in substantially undispersed state of the colloidal attapulgite or colloidal sepiolite additive to the composite adhesive composition, particularly to the raw starch paste prior to admixture thereto of the carrier portion. After mild mixing of the carrier portion with the modified raw starch paste, the resultant composite paste may be cycled in the corrugating plant with substantial improvement in viscosity stability being evidenced. As a result of improved viscosity stability of the starch paste there is realized an improvement in operating performance (such as coverage and machine speed) as well as improved bonding properties of the paste and decreased cost per unit volume of paste when applied at a relatively higher viscosity. It will be noted that although some decrease in viscosity of the starch paste, particularly an initial decrease in viscosity, may be evidenced when the additive of our invention is incorporated therein in accordance with our method, nevertheless, by suitable choice of additive concentration the viscosity may be at least maintained above an established critical operating level when cycled through the plant. This critical operating level may vary from plant to plant.

Attapulgite and sepiolite are unique among clay minerals in both their crystal structure, physical properties and rheological properties of aqueous systems thereof. Attapulgite and sepiolite are acicular clay minerals which occur in packets or clusters of individual laths. Frequently, a small amount of the mineral particles exist as particles of colloidal dimension. To disperse attapulgite and sepiolite into their ultimate particles which are of colloidal dimension, high shear rates must be applied to aqueous suspensions of attapulgite and sepiolite with the degree of dispersion depending to a great extent on the severity of the shear. Attapulgite and sepiolite do not disperse to their ultimate colloidal dimensions with low speed mixers, as is well known to those skilled in the art. As high shear is applied to aqueous attapulgite suspensions, there is formed a stable thickened system which does not coagulate. For example, at concentrations of 5%, attapulgite may be gelled in water by passing the system through a colloid mill, ball mill or certain pumps.

It is important to point out that not all grades of attapulgite and sepiolite commercially available are capable of being dispersed in aqueous media to particles of colloidal dimension since the native ability of attapulgite clusters to disperse into colloidal particles is reduced or eliminated by calcination which removes at least a portion of the chemically bonded water. Such calcination is conventionally termed "activation."

The terms "colloidal attapulgite" and "colloidal sepiolite" as used herein refer to attapulgite and sepiolite which have the ability to disperse into particles of colloidal dimension when sheared in aqueous media, the resultant colloidal dispersions thickening or gelling the system.

The term "undispersed" as used herein refers to agglomerates (or clusters or packets) of such colloidal attapulgite or colloidal sepiolite prior to their dispersion into colloidally dimensioned particles. It will be understood that by addition of colloidal attapulgite or the like to water, without application of high shear, some small amount of dispersion into colloidally dimensioned particles occurs either as a result of association of a small amount of colloidally dimensioned particles with the packets or due to breakdown of a packet. The term "substantially undispersed" is used herein to account for this condition.

Attapulgite, to be considered "colloidal" and thus suitable for the process of our invention, has a volatile matter (V.M.) content of at least about 10%, the term "volatile matter" referring to the weight percent of the mineral eliminated upon heating to essentially constant weight at about 1800° F. Raw attapulgite, as mined, has a total volatile matter content usually about 50%, and a free moisture (F.M.) content usually about 25%, free moisture being the weight percent of the mineral eliminated by heating to essentially constant weight at about 225° F. When the V.M. of attapulgite is reduced to or below 10% by activation, water of composition is eliminated from the lattice and the material is unsuitable for use in our process. The activation of attapulgite is described in an article entitled "Thermal Activation of Attapulgus Clay," W. S. W. McCarter et al., Industrial & Engineering Chemistry, vol. 42, page 529 (March 1952).

Similar considerations apply to the grade of sepiolite used in the practice of our invention.

It is important to note that although attapulgite and sepiolite are classified as clays, not all clays are suitable for use in the practice of the instant invention. For example, kaolin and swelling bentonite, both familiar clay types, are unsuitable. Kaolin does not disperse into colloidal particles to form gels in water and swelling bentonites hydrate and disperse too readily for use in the method of our invention.

Further it will be understood that attapulgite is otherwise known as Georgia-Florida fuller's earth or Attapulgus fuller's earth; however, not all fuller's earth comprises attapulgite and, in fact, other fuller's earth are not amenable to the method of the subject invention.

The action of the undispersed colloidal sepiolite or attapulgite in stabilizing the viscosity of the composite starch paste as it is mechanically worked may be explained as follows. At high shear rates the starch component of the paste progressively decreases in viscosity. However, at high shear rates the colloidal clay progressively disperses into colloidal particles, this progressively contributing to an increase in viscosity of the system. Thus, the tendency of the system to increase progressively in viscosity until complete dispersion of the colloidal attapulgite or sepiolite is effected is opposed by the tendency of the system to progressively decrease in viscosity due to the effect of shear on the starch component. By proper choice of colloidal attapulgite or colloidal sepiolite concentration, choice of shear rate, etc., these forces may be effectively counterbalanced so that the net effect is a susbtantially constant viscosity as the mixture is worked.

From the foregoing explanation, it should be readily apparent that the fact that colloidal sepiolite and attapulgite do not disperse to colloidal dimensions with low shear mixing renders these materials uniquely suitable for the method of our invention. Obviously materials which disperse colloidally in aqueous systems substantially spontaneously or with low speed mixing, e.g., swelling bentonite clays, alginates and various gums, will be unsuitable because during the process of preparing a uniform starch paste including such hydrophilic colloids the maximum or substantially maximum bodying contribution would be developed and the desired substantially constant viscosity of the worked paste would not be realized.

More specifically, and pursuant to a preferred form of our invention, colloidal attapulgite, or the like, is suspended by lightly mixing into a raw starch paste and into the attapulgite-modified raw starch paste is admixed, by low shear mixing equipment, a carrier starch portion comprising gelatinized starch, water, and such additives as may be conventionally used. The colloidal attapulgite or the like is employed in finely-divided condition, i.e., substantially all of the particles thereof are passable through a 325-mesh Tyler sieve. Preferably, the attapulgite, or the like, is degritted, as by air flotation, and fluid energy milled or otherwise finely ground prior to use as a viscosity stabilizer. By low shear mixing is meant mixing which is inadequate to cause the attapulgite or sepiolite to appreciably disperse into their ultimate colloidal particles in water as evidenced by a tendency of the system to gel. Such shear rates may be determined by measuring the particle size of the attapulgite particles in the system at any shear rate.

The composite starch thus provided is pumped in the usual manner to the glue pot associated with a corrugating machine, with the unused portion and overflow from the glue pot being recycled to the corrugating machine or to storage means in the conventional manner. Since such apparatus forms no part of the subject invention and is well known to those skilled in the art, it will not be described herein.

We have achieved particularly outstanding results utilizing, in admixture with colloidal attapulgite, cornstarch as the carrier starch and tapioca as the raw starch. Improved viscosity stability characteristics were also realized when a major portion of raw tapioca starch was admixed with a lesser portion of raw cornstarch and boiled cornstarch used as a carrier starch. Substantial improvement in viscosity stability was attained when colloidal attapulgite was included in a composite starch adhesive including raw cornstarch and a boiled cornstarch carrier.

It will be understood that other starches may be used in the carrier and raw starch portions of the composited adhesive. The carrier starch, whether corn or other starch, may be chemically or enzyme treated in accordance with methods well known in the art. Also, there may be included in the composite starch, synthetic resinous adhesives, such as suitable ureaformaldehyde resins and polyvinyl alcohol resins. As examples of other cooked starches may be cited maize and potato starch.

Ordinarily, a small amount of caustic, particularly

NaOH, is added to the boiled starch mixture during its preparation. The caustic lowers the gelation temperature of the raw starch. Borax is ordinarily added to the raw starch for the purpose of increasing the viscosity build up of the starch after its application to the flutes.

In the preparation of the adhesive in accordance with the method of our invention, the carrier portion is prepared, preferably using a more or less standardized formula including, for example, about 400 parts by weight of water, 60 parts by weight of cornstarch, and 9 parts by weight of NaOH. These ingredients are cooked to about 160° F. for 10 minutes and cooled to 100° F. The raw starch portion is prepared in a separate vessel by admixing with mild agitation water, raw starch, colloidal attapulgite and preferably borax. Typically, about 1000 parts by weight of water are employed for about 250 parts by weight of tapioca starch with attapulgite being present in varying amounts such as are experimentally found to stabilize the viscosity of the specific formulation at the particular shear rates encountered in the corrugating plant. Since the quality of the starch, pH of the formulations and degree of shear employed in handling the paste have a marked effect on the viscosity of the ultimate composited paste, the optimum quantity of attapulgite will best be determined experimentally. We have experimentally found that, utilizing a particular high grade raw tapioca starch, an attapulgite starch ratio of about 1 to 10 gave outstanding results under operating conditions established in a corrugating plant, although it is reasonable to assume that utilizing other grades of tapioca a higher or lower attapulgite starch ratio will be preferable.

The cooked starch is then added slowly to the raw starch mixture with mild agitation to obtain the final paste. The cooked starch is added in amount sufficient to obtain the desired initial viscosity.

The attapulgite is preferably added to the raw starch portion of the composite adhesive. Furthermore, it is highly preferable to add the attapulgite to the raw starch prior to the time at which cooked starch is admixed with the raw starch mix since otherwise excessive shear may be required to distribute the attapulgite in the composited adhesive, this resulting in premature dispersion of attapulgite. When this takes place the capacity of the attapulgite to stabilize the composite adhesive when it is mechanically worked is minimized.

EXAMPLE I

This example illustrates the ability of colloidal attapulgite to stabilize the viscosity of composite cooked cornstarch-raw tapioca adhesives.

In the example, the same cooked starch mixture was used in all samples. In a control sample the cooked starch was admixed with a raw starch mixture in the absence of attapulgite viscosity stabilizer. Other samples were prepared in which portions of the raw starch were replaced with colloidal attapulgite in amount such as to provide an initial viscosity which matched that of the control. In all samples in which it was used the attapulgite was added to the raw starch mixture and the boiled starch mixture added thereto.

The carrier formula for all samples was:

|  | Gms. |
|---|---|
| H₂O | 414 |
| Cornstarch | 60 |
| NaOH | 9 |

The ingredients of the carrier formula were cooked to 160° F. for 10 minutes and cooled to 100° F.

Varying portions of this carrier were slowly added to the raw starch mixtures with agitation. Formulations for the raw starch mixtures are tabulated below in Table I.

The attapulgite was Attagel 20, a colloidal grade of degritted fluid energy milled fuller's earth processed and sold by Minerals & Chemicals Corporation of America.

The volatile matter content of Attagel 20 is about 27%, volatile matter content being the weight percentage of the mineral eliminated by heating to essentially constant weight at 1800° F. The free moisture content of Attagel 20 is about 19%, free moisture being the weight percentage of the mineral eliminated by heating to essentially constant weight at 225° F. By wet screen analysis Attagel is substantially —325 mesh.

In Table I there is recorded for each formulation the initial viscosity (as measured by the Penick & Ford Viscometer) and the viscosity after various intervals of mixing at about 3600 r.p.m. with an Eppenbach mixer. The Eppenbach mixer is a high shear mixer which includes a stationary cylinder and a high speed blade stationed within the cylinder in such a manner that there is only a small clearance between the cylinder and the outer periphery of the blade.

The shearing rate employed was designed to be substantially more severe than the adhesive would meet under plant conditions so that viscosity changes could be observed in reduced time intervals.

Table I

|  | Control | A | B | C | D |
|---|---|---|---|---|---|
| Raw Starch Formula: |  |  |  |  |  |
| H₂O, # | 684 | 684 | 684 | 684 | 684 |
| Attagel 20, # |  | 15 | 18 | 22 | 7.5 |
| Starch, Tapioca, # | 234 | 220 | 216 | 212 | 226 |
| Carrier Added, # | 486 | 350 | 300 | 300 | 468 |
| Initial Viscosity (Sec.) | 83 | 80 | 82 | 82 | 80 |
| Starting Viscosity (Sec.) | 83 | 80 | 82 | 82 | 80 |
| Viscosity (Sec.) After Mixing: |  |  |  |  |  |
| 2 min | 49 | 64 | 76 | 66 | 55 |
| 1 min | 47 | 68 | 82 | 65 | 53 |
| 3 min | 40 | 68 | 82 | 67 | 47 |
| 6 min | 36 | 77 | 82 | 67 | 46 |
| 15 min | 33 | 65 | 72 | 60 | 43 |
| 15 min | 33 | 60 | 72 | 59 | 43 |
| Percent Attagel, based on wt. of starch in carrier |  | 34.5 | 48.4 | 59.1 | 12.5 |

The results show that the control sample containing no attapulgite was reduced from 88 to 33 sec. during the test whereas the viscosity of the starch paste B in which Attagel 20 was present in amount of 48.4%, based on the carrier starch, was essentially constant throughout the run.

The use of the colloidal attapulgite in the composite starch has a favorable effect on the bond strength, in many formulations improving substantially the strength from what it would be in the absence of the attapulgite.

EXAMPLE II

The following is an example of the use of colloidal attapulgite in stabilizing the viscosity of various raw tapioca boiled cornstarch adhesives during a run at a corrugating plant.

The formulations used were:

|  | Double Back | Single Face | |
|---|---|---|---|
|  |  | A | B |
| Primary Starch: |  |  |  |
| Water, total gallons | 295 | 295 | 295 |
| Cornstarch pounds | 360 | 350 | 350 |
| Caustic Soda pounds | 48 | 33 | 33 |
| Secondary Starch: |  |  |  |
| Water gallons | 620 | 620 | 620 |
| Attagel 20 pounds | 60 | 60 | 60 |
| Borax pounds | 46 | 32 | 32 |
| Tapioca Starch pounds | 1,210 | 1,320 | 1,210 |
| Formaldehyde gallons | 1,100 | 1,100 | 1,100 |

The two formulas are substantially identical with the exception that the paste for the single face station is usually lower in viscosity and higher in gel temperature than that for the double back station.

The primary starch was prepared by adding cornstarch and caustic soda to 60 gal. of water heated to 100° F. and the mixture slowly heated to 160° F. and held at that temperature for 10 minutes. 135 gal. of cold water were added to the gelatinized starch. The secondary starch was prepared in a second vessel by slowly adding Attagel 20 to water heated to 88° F. and mixing lightly to substantial homogeneity. Borax and raw tapioca starch were then added to the Attagel-water mixture. The primary starch was then slowly added into the secondary starch during a period of 25 minutes to complete the mixing. 7 lbs. of formaldehyde was added to each mixture.

The addition of the Attagel 20 to the double back formulation at the rate of 60 lbs./1100 gal. maintained the viscosity of the paste above the established critical operating level of 45 seconds (Stein-Hall value measured at glue pot) during a 24 hour cycle at a corrugating plant.

The addition of the Attagel 20 to the single back formulation at the rate of 60 lbs./1100 gal. maintained the viscosity of the paste above the established critical operating level of 30-45 sec. during a 24 hour run at the same plant. Furthermore, reduction in starch level to 1210 lbs. per 1100 gal. (as in formation B) did not adversely affect viscosity, adhesion, machine rate or application rate. Furthermore, 48 hour storage of both double back and single face pastes did not adversely affect viscosity or application properties.

On the other hand, comparable double back and single face formulations omitting the Attagel 20 and including 1320 lbs. of tapioca starch per 1100 gal. were materially reduced in viscosity after being worked a comparable period and standing overnight. For example, the double back formulation without Attagel 20 had a viscosity of 30 sec. after being worked and standing in storage for 48 hours. The double back formulation without Attagel 20 had a viscosity of only 19 sec. after being worked and being stored overnight.

Thus it is evident that the attapulgite improved substantially the viscosity characteristics of the starch paste. Further it was noted that the attapulgite permitted reduction of the amount of starch necessary for adhesion without adversely affecting machine speed, rate of application, or bond strength.

EXAMPLE III

A corrugating starch paste was prepared including initially undispersed colloidal attapulgite (at the rate of 50 lbs. per 700 gallons of paste). The formulation was cycled in a corrugating plant until substantially depleted and regular observations of viscosity, temperature, bonding properties and adhesion were noted and recorded.

The formulation is tabulated below:

Primary starch:
  Water _____gal__ 174
  Cornstarch _____lbs__ 180
  Caustic _____lbs__ 36
Secondary starch:
  Water _____gal__ 420
  Borax _____lbs__ 35
  Attagel 20_____lbs__ 50
  Tapioca _____lbs__ 1000
  Cornstarch _____lbs__ 20
  Formaldehyde _____qt__ 1

The primary starch was prepared by mixing the indicated quantity of cornstarch in 94 gallons of water, heating to 140° F., adding the caustic (36 lbs. dissolved in 10 gallons water), heating to 160° F. and agitating for 15 minutes and adding 70 gallons of cold water. The secondary starch portions were each prepared in a separate vessel by adding borax to water heated to 100° F., and lightly mixing in Attagel 20 to suspend the Attagel 20. Thereafter, the indicated quantity of starch, tapioca, or tapioca and cornstarch was added to the Attagel 20 mixture. The carrier was slowly added to the secondary mixture and gently admixed therewith for 20 minutes. The formaldehyde was added to the finished pastes.

The addition of the Attagel stabilized the viscosity of the paste within a range of 33-27 sec. (at a glue pan temperature of about 100° F.). For single face board, the glue roll was adjusted to a 0.011" clearance; whereas, for double back board, the clearance was 0.010". Extended storage for 60 hours with agitation resulted in a 5 sec. drop (measured at 80° F.) in viscosity of a freshly prepared 700 gallon batch.

The bonding properties of the paste was excellent throughout the run and the paste exhibited good adhesions to the rolls even when the volume of starch paste in the tank was reduced to 65 gallons.

A further outstanding advantage using this formulation was the paste application dropped 20% without adverse effect from the application rate of a like formulation excluding the attapulgite and using the total cornstarch content in the carrier.

We claim:

1. A composite starch adhesive paste having improved viscosity characteristics which comprises water, starch, agglomerates of a clay selected from the group consisting of colloidal attapulgite clay and colloidal sepiolite clay and mixtures thereof, in which a small percentage of the starch is cooked starch which acts as a carrier for the remainder of the starch, which is raw, said clay agglomerates being present in a quantity less than that of said cooked starch and in amount such that when said paste is pumped the normal tendency of the viscosity of said paste to decrease progressively is counterbalanced by the tendency of the viscosity of said paste to increase progressively as a result of the dispersion in the water of said clay agglomerates into ultimate colloidally dimensioned clay particles composing said agglomerates.

2. A composite starch adhesive paste having improved viscosity characteristics which comprises water having suspended therein minus 325 mesh agglomerates of attapulgite clay and starch, in which a small percentage of the starch is cooked starch which acts as a carrier for the remainder of the starch, which is raw and said clay agglomerates are present in a quantity in a quantity less than that of said cooked starch and in an amount such that when said paste is pumped the normal tendency of the viscosity of said paste to decrease progressively is counterbalanced by the tendency of the viscosity of said paste to increase progressively as a result of the dispersion in the water of said clay agglomerates into ultimate colloidally dimensioned clay particles composing said agglomerates.

3. A method for preparing a composite starch adhesive paste of improved viscosity stability which comprises forming an aqueous dispersion of cooked carrier starch, separately forming an aqueous suspension of raw starch and minus 325 mesh agglomerates of a clay selected from the group consisting of colloidal attapulgite clay, colloidal sepiolite clay and mixtures thereof, and slowly mixing said aqueous dispersion of cooked starch with said aqueous suspension of raw starch with mild agitation without breaking up said clay agglomerates into the ultimate colloidally dimensioned clay particles composing said agglomerates, said cooked starch being present in the resulting mixture in amount which is a small percentage of the total starch present and said clay agglomerates being present in a quantity less than that of said cooked starch and in amount such that when said resulting mixture is pumped the normal tendency of the viscosity to decrease progressively is counterbalanced by the tendency of the viscosity to increase progressively as a result of the dispersion in the water of said clay agglomerates into colloidally dimensioned clay particles composing said agglomerates.

4. A method for preparing a composite starch adhesive paste of improved viscosity stability which comprises forming an aqueous mixture of raw starch minus 325 mesh agglomerates of a clay selected from the group consisting of colloidal attappulgite clay, colloidal sepiolite clay and mixtures thereof, by mixing said raw starch with said agglomerates in a manner such as to prevent the dispersion in the water of said agglomerates into the ultimate colloidally dimensioned particles composing them, separately forming an aqueous dispersion of cooked starch, and slowly mixing said aqueous dispersion of cooked starch into said aqueous mixture of raw starch and clay agglomerates with mild agitation so as to prevent the dispersion in the water of said clay agglomerates into the ultimate colloidally dimensioned particles composing them, said cooked starch being present in the resulting mixture in amount which is a small percentage of the total starch present and said clay agglomerates being present in a quantity less than that of said cooked starch and in amount such that when said resulting mixture is pumped the normal tendency of the viscosity to decrease progressively is counterbalanced by the tendency of the viscosity to increase progressively as a result of the dispersion in the water of said clay agglomerates into colloidally dimensioned clay particles composing said agglomerates.

5. In a continuous process for applying a composite raw starch-cooked adhesive paste to successive portions of a fibrous sheet material which involves forming an aqueous adhesive paste containing starch, a small percentage of which is cooked starch which acts as a carrier for the remainder of the starch which is raw, applying a portion of said paste to the fibrous sheet material, pumping the unused paste to storage and pumping said paste from storage to recirculate said paste into contact with said fibrous sheet material, the improvement which consists in mixing into said paste before its initial application to said sheet material minus 325 mesh agglomerates of a clay selected from the group consisting of collodial attapulgite clay, colloidal sepiolite clay and mixtures thereof, in a manner such as to prevent the dispersion of said agglomerates into the ultimate colloidally dimensioned clay particles composing said agglomerates, said clay agglomerates being present in a quantity less than that of said cooked starch and in an amount such that when the unused paste is pumped the normal tendency of said starch paste to progressively decrease in viscosity will be counterbalanced by the tendency of said paste to progressively increase in viscosity as a result of the dispersion during the pumping of said clay agglomerates into the ultimately colloidally dimensioned clay particles.

References Cited in the file of this patent

UNITED STATES PATENTS

| | | |
|---|---|---|
| 1,498,269 | Harris | June 17, 1924 |
| 2,563,661 | Rood | Aug. 7, 1951 |
| 2,641,557 | Green | June 9, 1953 |
| 2,699,432 | Marra | Jan. 11, 1955 |
| 2,892,731 | Claxton | June 30, 1959 |
| 2,903,391 | Kerr | Sept. 8, 1959 |